United States Patent [19]

Abbema et al.

[11] Patent Number: 4,913,465
[45] Date of Patent: Apr. 3, 1990

[54] COUPLED PIPE ASSEMBLY

[75] Inventors: William D. Abbema; Casey J. Jones, both of Houston, Tex.

[73] Assignee: Tuboscope Inc., Houston, Tex.

[21] Appl. No.: 235,457

[22] Filed: Aug. 24, 1988

[51] Int. Cl.⁴ ............................................. F16L 13/02
[52] U.S. Cl. .................................. 285/22; 285/55; 285/286 (U.S. only); 285/286; 285/370
[58] Field of Search .................... 285/22, 286, 55, 370

[56] References Cited

U.S. PATENT DOCUMENTS

| | | | |
|---|---|---|---|
| 1,920,449 | 8/1933 | Unke | 285/22 |
| 1,980,561 | 11/1934 | Wagner | 285/22 |
| 2,366,579 | 1/1945 | Von Ahrens | 285/22 |
| 2,646,995 | 7/1953 | Thompson | 285/286 |
| 3,508,766 | 4/1970 | Kessler et al. | 285/286 X |

Primary Examiner—Thomas F. Callaghan
Attorney, Agent, or Firm—Finnegan, Henderson, Farabow, Garrett & Dunner

[57] ABSTRACT

A coupled pipe assembly having a pair of opposed, axially positioned pipes each having opposed beveled ends and interior corrosion-resistant linings. A sleeve having heat-insulating material is inserted axially within the pipes with the heat-insulating material being positioned adjacent the opposed pipe ends to protect the corrosion-resistant linings from heat produced during the welding of the pipe ends. The sleeve has a uniform, continuous diameter along the entire length thereof.

4 Claims, 2 Drawing Sheets

COUPLED PIPE ASSEMBLY

BACKGROUND OF THE INVENTION

1. Field of the Invention

This invention relates to a coupled pipe assembly wherein the opposed ends of pipes having an internal coating or lining of corrosion-resistant material are joined by welding. An internal sleeve is used in association with the coupled pipe ends to protect the corrosion-resistant lining of the pipes from heat damage incident to the welding operation.

2. Description of the Prior Art

In various applications, such as in the oil and gas industry, there is a need for alloy pipe, such as steel pipe, provided with a lining of corrosion-resistant material. For this purpose, it is known to bond to the pipe interior various epoxy base materials, polyethylene, polyvinyl chloride, and other thermoplastic and thermosetting materials.

With pipe having internal coatings of materials of this type to provide corrosion resistance, protection must be provided for the coating to prevent deterioration thereof by the heat generated incident to the welding of the pipe ends.

Various assemblies are conventionally employed for this purpose. These assemblies include an internal sleeve having a heat-insulating barrier for positioning adjacent the weld zone of the opposed pipe ends for protection of the corrosion-resistant coating. The interior of the sleeve is provided with a corrosion-resistant coating of the same type as that of the pipe interior. One example of an assembly of this type is disclosed in Kesseler et al. U.S. Patent 3,508,766, issued Oct. 25, 1968.

With prior art assemblies of the type disclosed in the aforementioned patent, it is necessary to provide pipe ends having expanded or belled end portions. This structure is provided so that the sleeve which is provided with mating tapered end portions may be fitted into the pipe ends to support the same in the spaced-apart position required for subsequent welding by deposit of weld material within the space between the pipe ends. With assemblies of this type, the requirement for belling the pipe ends and tapering the ends of the associated sleeve adds significantly to the cost of producing the coupled pipe assembly.

In addition, during assembly, the heat-insulating material adjacent the weld zone may be displaced within the weld zone to impair the welding operation. It is necessary, of course, for the heat-insulating material to be adjacent the weld zone to ensure effective protection of the corrosion-resistant coating from deterioration during welding.

SUMMARY OF THE INVENTION

It is accordingly a primary object of the present invention to provide a coupled pipe assembly wherein special preparation of the pipe ends, as by belling thereof, is not required for use in association with a sleeve having heat-insulating material to protect the corrosion-resistant layer of the pipe during welding of the pipe ends.

Another object of the invention is to provide a coupled pipe assembly having an internal sleeve with associated heat-insulating material retained in a manner that avoids displacement of the heat-insulating material into the weld area to impair effective welding.

Additional objects and advantages of the present invention will be set forth in part in the description that follows and in part will be obvious from the description or may be learned by the practice of the invention. The objects and advantages of the invention may be realized and obtained by the assembly particularly pointed out in the appended claims.

In the broadest aspects of the invention, a coupled pipe assembly is provided having a pair of opposed, axially positioned pipes each having opposed beveled ends spaced apart to form a separated area therebetween. Each of the pipes is provided with a corrosion-resistant lining on the interior surface thereof. A sleeve having a uniform, continuous diameter along the entire length thereof is inserted axially within the pipes between opposed beveled ends thereof along a uniform, continuous diameter portion of the pipes. The sleeve includes a pair of O-ring seals each circumferentially mounted on the sleeve a distance from each end thereof. The O-ring seals are in sealing engagement with the interior surfaces of the pipes. A circumferential relieved area is provided in an exterior surface of the sleeve between the positions of the O-ring seals. A layer of heat-insulating material is provided within the relieved area. The heat-insulating material has an outer surface terminating short of the exterior surface of the sleeve. A plurality of retainers are provided for retaining the heat-insulating material within the relieved area of the sleeve. The retainers are connected to opposed edge surfaces of the relieved area in spaced apart relation. Each of the retainers has a lug radially extending therefrom and into the separated area between the opposed, beveled pipe ends and into contact therewith. Each lug terminates short of the exterior surfaces of the pipes. A continuous weld deposit is provided in the separated area and is bonded to each lug and to the pipe ends form a weld joint between opposed ends of the pipes. This bond with the weld serves to firmly fix the sleeve in the assembly. A sealant is provided between exterior surfaces of the sleeve and interior surfaces of the pipes.

The relieved area of the sleeve and the heat-insulating material provided therein may be substantially centrally disposed relative to the separated area between the opposed pipe ends. The separated area of the opposed pipe ends may have a narrow portion within which each lug is positioned and a diverging portion extending therefrom in which the weld deposit is produced during the welding operation.

Each of the retainers may extend across the relieved area adjacent the outer surface of the heat-insulating material. Each lug may be centrally disposed on each associated retainer.

DETAILED DESCRIPTION OF THE PREFERRED EMBODIMENTS

Reference will now be made in detail to a presently preferred embodiment of the invention, an example of which is described below and illustrated in the accompanying drawings.

Figure 1:
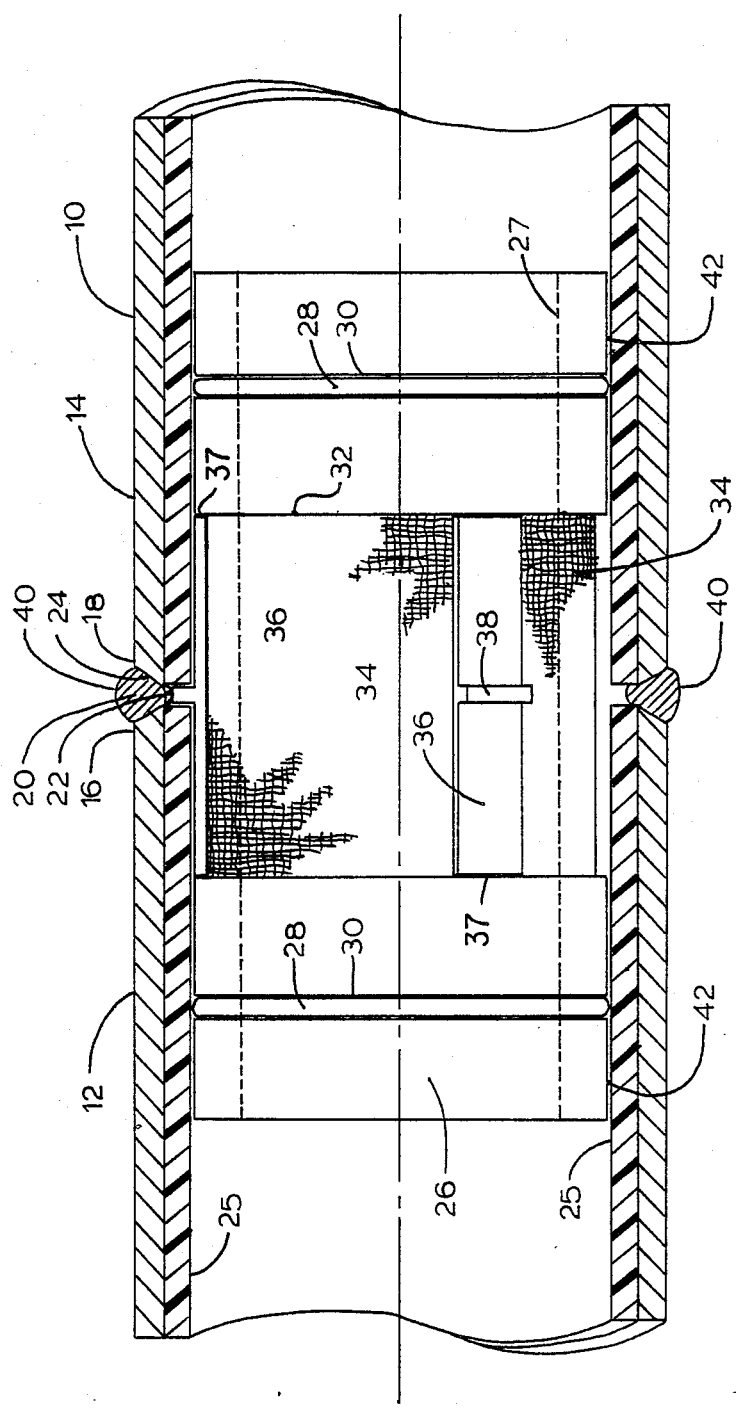
FIG. 1 of the drawings is a view in partial section of a coupled pipe of one embodiment of the invention.

With reference to the drawings, and for the present to FIG. 1 thereof, there is shown a coupled pipe assembly, designated as 10, in accordance with an embodiment of the invention. The assembly 10 has two opposed pipes 12 and 14 in axial alignment. Each opposed pipe end 16 and 18 of pipes 12 and 14, respectively, is beveled to provide a separated portion 20 therebetween. The separated portion 20 has a narrowed portion 22 and a diverging portion 24 extending therefrom. The pipes may be made of steel and have a corrosion-resistant internal coating or layer 25 of any suitable conventional material.

A sleeve 26, which may also be of steel having an internal coating or layer 27 of corrosion-resistant material similar to that used to line the tubing, is positioned axially within the pipes and extends between the ends 16 and 18 thereof.

The sleeve 26 near opposite ends thereof has a pair of O-ring seals 28 provided in grooves 30 of the sleeve. Centrally disposed in the exterior surface of the sleeve is a circumferential relieved area 32 around which is wrapped heat-insulating material 34. The heat-insulating material 34 may be a silica-based heat-insulating wrap or asbestos wrap. Heat-insulating material retainers 36 are welded, as at 37, to oppose edge surfaces of the relieved area and extend across the heat-insulating material. Typically, three retainers 36 are provided each of identical construction and spaced at 120-degree intervals around the circumferential relieved area of the sleeve.

Figure 2:
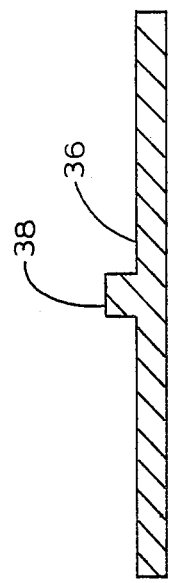
FIG. 2 is a detailed view of the retainer shown in FIG. 1.

Each retainer 36, as shown in FIG. 2, has a lug 38 extending into the narrow portion 22 of the separated area between the pipe ends, as shown in FIG. 1. The pipe ends are coupled and the sleeve is secured to the assembly by a continuous weld deposit 40 provided in the separated area. The weld deposit is bonded to the lugs 38 to secure the sleeve in permanent position in the assembly.

During insertion of the sleeve within the pipes to the position shown in FIG. 1, an adhesive sealant 42 is provided between adjacent exterior surfaces of the sleeve and interior surfaces of the tubing, which sealant during insertion of the sleeve is spread evenly over the interior pipe surfaces and exterior sleeve surface by the O-ring seals 28. The sealant designated as 42 is distributed to provide additional sealing at the ends of the sleeve.

The combination of the separated portion 20 and associated lugs 38 positioned in the narrowed portion 22 thereof provides for effective and accurate separation of the pipe ends in proper position and alignment for welding. Upon welding, the weld deposit 40 then secures not only the pipe ends but also the sleeve in permanent assembly. This obviates the need for belling the portions of the pipe associated with the sleeve and tapering the sleeve ends in accordance with prior art practices.

The retainers 36 maintain the heat-insulating material 34 in position for effective protection of the corrosion-resistant coating of the assembly from damage incident to heat generated by the welding operation, and in addition prevent the heat-insulating material from being displaced into the separated area between the pipe ends during the insertion of the sleeve within the pipes to interfere with the subsequent welding operation.

WHAT IS CLAIMED IS;

1. A coupled pipe assembly comprising a pair of opposed, axially positioned pipes each having opposed beveled ends spaced apart to form a separated area therebetween, a corrosion-resistant lining on interior surfaces of said pipes, a sleeve of uniform, continuous diameter along the entire length thereof inserted axially within said pipes between said opposed beveled ends along a uniform continuous diameter portion of said pipes, said sleeve including a pair of O-ring seals each circumferentially mounted on said sleeve a distance from each end thereof and in sealing engagement with said interior surfaces said pipes, a circumferential relieved area in an exterior surface of said sleeve between said O-ring seals, a layer of heat-insulating material provided within said relieved area and having an outer surface terminating short of said exterior surface of said sleeve, a plurality of retainers for retaining said heat-insulating material within said relieved area of said sleeve, said retainers being connected to opposed edge surfaces of said relieved area in spaced-apart relation and each of said retainers having a lug radially extending into said separated area between said opposed, beveled pipe ends and in contact therewith, each said lug terminating short of exterior surfaces of said pipes, a continuous weld deposit produced in said separated area and bonded to each said lug and to the opposed beveled pipe ends to form a welded joint between said opposed ends of said pipes and a sealant provided between said exterior surface of said sleeve and said interior surfaces of said pipes.

2. The coupled pipe assembly of claim 1 further comprising said relieved area and layer of heat-insulating material provided therein being substantially centrally disposed relative to said separated area between said opposed pipe ends.

3. The coupled pipe assembly of claim 2 further comprising said separated area of said opposed beveled ends of said pipes having a narrowed portion within which each lug is positioned and a diverging portion extending from said narrowed portion in which said weld deposit is produced.

4. The coupled pipe assembly of claim 3 further comprising each of said retainers extending across said relieved area adjacent said outer surface of said heat-insulating material, and each said lug being centrally dispospsed on each said associated retainer.

* * * * *